(12) United States Patent
Dunn et al.

(10) Patent No.: US 9,279,084 B2
(45) Date of Patent: Mar. 8, 2016

(54) SECURITY DEVICE USING LIQUID CRYSTALS

(71) Applicant: OPSEC SECURITY GROUP, INC., Denver, CO (US)

(72) Inventors: Paul Dunn, Leicestershire (GB); Robert Edward Renton, Lincolnshire (GB); Andrew Neil Cammidge, Norwich (GB)

(73) Assignees: OPSEC SECURITY GROUP, INC., Denver, CO (US); UNIVERSITY OF EAST ANGLIA (GB)

( * ) Notice: Subject to any disclaimer, the term of this patent is extended or adjusted under 35 U.S.C. 154(b) by 64 days.

(21) Appl. No.: 14/207,939

(22) Filed: Mar. 13, 2014

(65) Prior Publication Data
US 2014/0264168 A1 Sep. 18, 2014

Related U.S. Application Data

(60) Provisional application No. 61/788,726, filed on Mar. 15, 2013.

(51) Int. Cl.
*C09K 19/58* (2006.01)
*B05D 3/06* (2006.01)
*C09K 19/04* (2006.01)
*C09K 19/32* (2006.01)

(52) U.S. Cl.
CPC ............. *C09K 19/586* (2013.01); *B05D 3/067* (2013.01); *C09K 2019/0448* (2013.01); *C09K 2019/323* (2013.01)

(58) Field of Classification Search
CPC ...... B05D 3/065; B05D 3/067; C09K 19/586; C09K 2019/0448; C09K 2019/323
See application file for complete search history.

(56) References Cited

U.S. PATENT DOCUMENTS

| | | | |
|---|---|---|---|
| 4,614,619 A | 9/1986 | Shannon | |
| 4,637,896 A | 1/1987 | Shannon | |
| 4,893,906 A | 1/1990 | Makow | |
| 8,865,272 B2 * | 10/2014 | Wang et al. | 428/1.1 |
| 2014/0160420 A1 * | 6/2014 | Wang et al. | 349/176 |

FOREIGN PATENT DOCUMENTS

| | | |
|---|---|---|
| EP | 0982605 | 1/2000 |
| WO | 2000034808 | 6/2000 |
| WO | 2005105474 | 10/2005 |
| WO | 2008046537 | 4/2008 |

* cited by examiner

*Primary Examiner* — Shean C Wu
(74) *Attorney, Agent, or Firm* — Eckert Seamans Cherin & Mellott, LLC; Carol A. Marmo

(57) ABSTRACT

The invention generally relates to optically variable devices, methods of preparation and applications or uses therefor. In particular, the invention includes trigger molecules employed as a dopant for a liquid crystal material. The liquid crystal material contains helical elements having a natural twist. The dopant is effective to change the natural twist of the helical elements when the dopant is addressed with incident light. Suitable dopants are selected from binaphthalene and derivatives thereof.

16 Claims, 1 Drawing Sheet

IMAGE A          IMAGE B          IMAGE C

Binaphthalene     Linear extension along 2,6-     Low twist state

| IMAGE A | IMAGE B | IMAGE C |
|---|---|---|
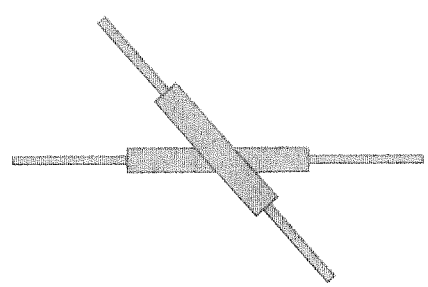
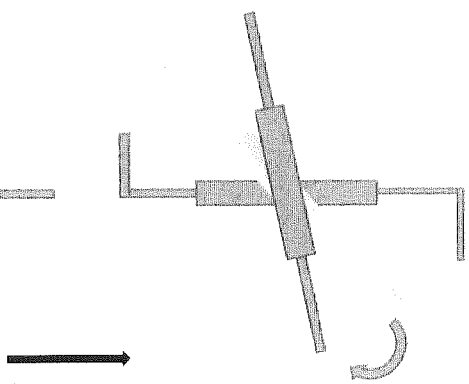
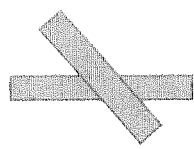
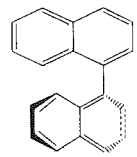
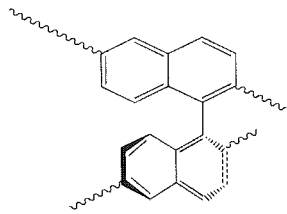
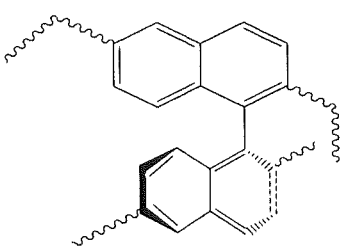
| Binaphthalene | Linear extension along 2,6- | Low twist state |

SECURITY DEVICE USING LIQUID CRYSTALS

CROSS-REFERENCE TO RELATED PATENT APPLICATIONS

This application claims the benefit of priority from U.S. Provisional Patent Application 61/788,726 filed on Mar. 15, 2013 and entitled "Security Device Using Liquid Crystals", which is incorporated herein by reference.

FIELD OF THE INVENTION

The invention generally relates to optically variable devices and, in particular, to new trigger molecules that are purpose-designed to be compatible with manufacturing processes leading to single and multiple color shifting films.

BACKGROUND OF THE INVENTION

Counterfeiting of goods, financial and identification documentation is a growing worldwide problem and has generated an industry in providing means to identify and authenticate genuine products. Optically variable devices (OVDs) provide a first line of defense by creating labels, hot foils, threads and laminates as both deterrent and authentication devices providing multiple level security protection and through the visual overt feature, a simple public recognition feature. Several technologies, such as holograms and color shifting inks, are used to create an image that in some way alters as the observer moves or rotates the security device. This may include changes in the image, switching from one image to another, changes in the color and several other variable effects that provide a means to identify the genuine from the counterfeit. Changes to the visual appearance of these security images provide clear differentiation from copies made by color photocopiers, for example, which cannot replicate these effects.

Technology development in the field of OVDs has included the use of liquid crystals to create an image that alters color as the angular view is changed. It is known that liquid crystals in a chiral nematic phase (cholesteric) form a helical structure that reflects circular polarized light over a narrow wavelength band. The color reflected back is created by a process referred to as constructive interference. The particular color is determined by the pitch of the helix and the angle of view. In its natural state, the individual helix elements are randomly oriented, so the incident light is scattered in all directions and no color is observed. When the material is aligned so that the cholesteric helical axis is perpendicular to the plane of the layer/substrate, for a majority of the structures, a strong color can be observed at a particular angle of view. The condition for constructive interference also occurs at a second more acute angle of view. Thus, a second, shorter wavelength spectrum is seen so that color one changes to color two as the angle of view is changed.

It is known that certain liquid crystal materials exhibit different colors when viewed in transmission or reflection and different intense colors are seen at different angles of view (U.S. Pat. Nos. 4,637,896; 4,614,619 and 4,893,906).

As competitive technologies continue to develop and counterfeiting skills and knowledge continue to increase, the ability to differentiate one security technology from another or from a counterfeit has greater importance. Increasing the range of color elements or effects achieves this differentiation and is described in the prior art. WO2005105474 describes a first optically active layer of cholesteric liquid crystal and a second partially active layer of cholesteric liquid crystal superimposed directly over the first layer. Reflected light from the two layers mix in an additive way to create a new range of color effects. WO2008046537 describes a similar method in which two layers of cholesteric liquid crystal are superimposed. The first layer is in the form of a motif or graphic design. The angular color selectivity of the layers are controlled so that the first layer reflects light into a green spectrum seen from one angle of view and the second layer reflects light into a green spectrum seen from a different angle of view.

A method of manufacturing a patterned layer of polymer material is described in WO200034808. A layer of cholesteric ordered liquid crystal material is patterned by the process of a convertible compound that when irradiated with certain energy sources alters the pitch of the helix structure in the exposed areas. The change in pitch alters the reflected and transmitted light. The material is then polymerized/cross linked by a UV source to freeze the layer and fix the perceived color. In this way a color pattern can be achieved. In EP0982605 there is described a chain terminating agent added to polymerizable material that absorbs the radiation used for polymerization and alters the pitch of the cholesteric helical structure. Variation in the radiation source used for polymerization alters the helical pitch and therefore, the reflected and transmitted colors.

WO200034808 and EP0982605 have significant drawbacks for application in manufacturing processes. For example, WO200034808 employs dose-dependent photo-isomerizing components where the absolute twisting power is low and the difference in twisting power between the two isomeric forms is modest. These factors combine to require a high concentration to achieve a visually appealing effect. EP0982605, for example, employs a combination of alignment-, temperature- and polymerization-induced phase change events to influence dose-dependent helical pitch variance that complicates manufacturing processes.

In the prior art, a material is typically applied as a single color with a graphic that is applied in the process as an area where the liquid crystal alignment is removed so that the image appears dark against the liquid crystal background color. There is a desire in the art to create an image that introduces a second color as opposed to black. There has been demonstrated that two colors may be exhibited in separate graphics, but there has not been shown exhibiting two colors in close register. It has been suggested that ink jet printing may potentially offer the ability to print several different mixes each reflecting a different color, but conventional ink jet technology is not capable of accommodating the liquid crystal material specifications, in particular, the high viscosity. Thus, there is a desire to create more than one color in register. Accordingly, there is a need in the art to develop new liquid crystal materials and methods that can be employed with ease in manufacturing processes to produce OVDs which exhibit more than one color in register. The invention relates to achieving this objective utilizing a dopant approach.

SUMMARY OF THE INVENTION

In one aspect, the invention provides a dopant for a liquid crystal material which contains helical elements having a natural twist. The dopant is effective to change the natural twist of the helical elements when addressed with incident light. The dopant includes at least one trigger molecule having a structure selected from Formulas A, A1, A2, A3, 1, 2, 3 and mixtures thereof:

A

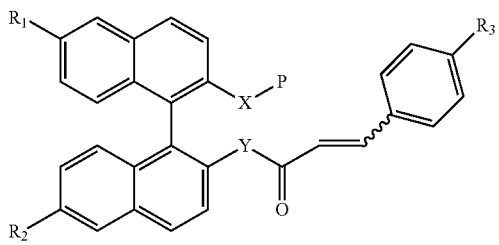

A1

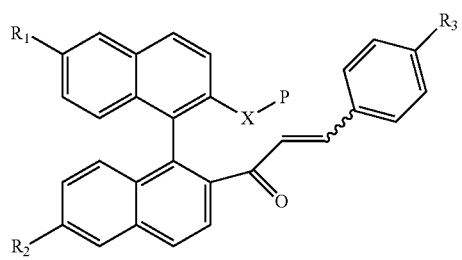

A2

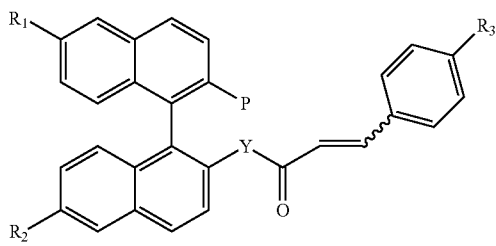

A3

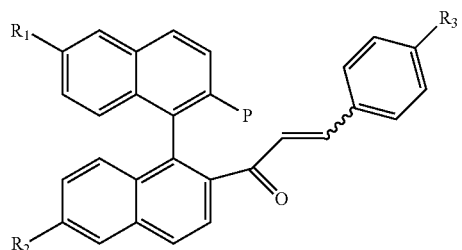

1

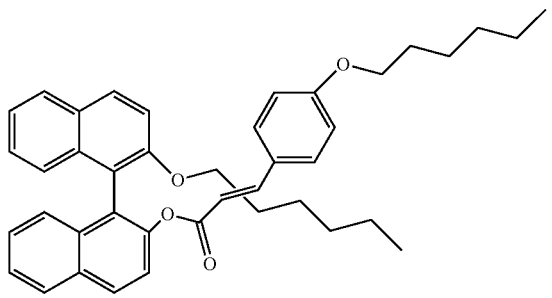

2

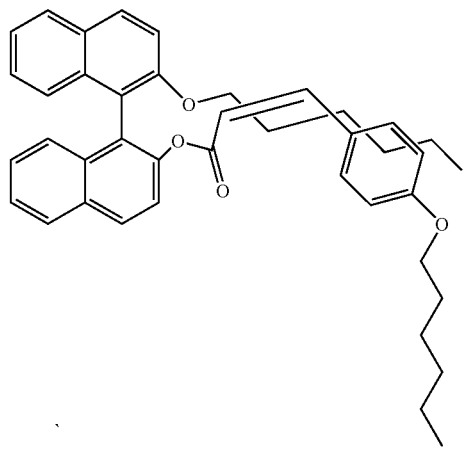

3 wherein each of $R_1$, $R_2$ and $R_3$ is independently H, aryl or alkyl, linked directly or as ethers or esters, to confer solubility and modulate twisting power, each of X and Y is independently O, O(CH$_2$)$_3$O—, O(CH$_2$)$_4$O— or O(CH$_2$)$_6$O—, and P is acrylate, methacrylate or styrene.

In certain embodiments, the at least one trigger molecule has the structure of the Formula 3 wherein X is O(CH$_2$)$_6$O—.

The change in the natural twist of the helical elements can be dependent on wavelength of the incident light, intensity of the incident light and time of exposure to the incident light. The incident light can be provided by a light source selected from the group consisting of a lamp, light emitting diode, laser and combinations thereof.

In another aspect, the invention provides an optically variable device including a substrate, and a composition deposited on at least a portion of the substrate to form a layer thereon. The composition includes a liquid crystal material and a dopant containing at least one trigger molecule having a structure of selected from Formulas A, A1, A2, A3, 1, 2, 3 and mixtures thereof as described above.

A wide variety of substrates may be used in the invention including conventional substrates known in the art for optically variable devices. Non-limiting examples of suitable substrates can be selected from the group consisting of polyester and polyester-containing materials.

The optically variable device can produce multiple color effects visible by the naked eye when viewed at one or more angles.

In yet another aspect, the invention provides a method of preparing an optically variable device including providing a substrate and depositing a composition on at least a portion of the substrate to form a layer thereon. The composition includes a liquid crystal material and a dopant containing at least one trigger molecule having a structure selected from Formulas A, A1, A2, A3, 1, 2, 3 and mixtures thereof as described above. The method further includes aligning the layer, addressing the dopant in the layer to induce a chiral twist therein, wherein addressing comprises exposing the dopant in the layer to incident light, and curing the layer to fix said chiral twist.

The method can further include varying at least one of wavelength of the incident light, intensity of the incident light and exposure time to the incident light, to obtain a desired twist in the layer.

The deposition of the composition can be conducted by methods selected from the group consisting of layer and printing. The curing step can be conducted by polymerization of the layer or a variable line illumination system.

The addressing step can be conducted by employing fixed masks with a flood light source or by employing a variable scanning light source. Further, the addressing can be conducted at a wavelength that is different from the wavelength employed for the curing. The wavelength employed for curing can be about 360 nm or about 260 nm. A photoinitiator can be used in curing and the wavelength employed can be between about 200 to about 600 nm.

BRIEF DESCRIPTION OF THE DRAWINGS

A further understanding of the invention can be gained from the following description of the preferred embodiments when read in conjunction with the accompanying drawings in which:

FIG. 1 is a schematic that illustrates the twisting power of binaphthalene and derivatives thereof, in accordance with certain embodiments of the invention.

DETAILED DESCRIPTION OF PREFERRED EMBODIMENTS

The invention relates generally to optically variable devices (OVDs) and, more particularly, to the use of dopants to create new liquid crystal materials and methods of manufacture. The invention includes the identification and use of dopants which include trigger molecules that are purpose-designed to be compatible with manufacturing processes leading to single and multiple color shifting films. Throughout the description, the terms "trigger molecule(s)" and "dopant" are used interchangeably. The trigger molecules are designed to have inherently high twisting power so their influence on the chiral nematic formulation is effective at low concentrations with minimal perturbation of base formulation properties (e.g., liquid crystal behavior). Further, the trigger molecules are designed such that in the photo-induced switched state (i.e., isomer) the twisting power is significantly changed. Furthermore, the trigger molecules are designed such that the irradiation wavelength influencing photoisomerization can extend beyond the absorption of the bulk liquid crystal formulation. Across these wavelengths, the photostationary state and therefore, twisting power of the trigger molecules is wavelength dependent. Thus, pitch and color variation may be achieved by controlling light dosage including intensity of the light or exposure time to the light, or wavelength or combinations thereof. The trigger molecules (dopants) can have the structure of Formulas A, A1, A2, A3 and mixtures thereof.

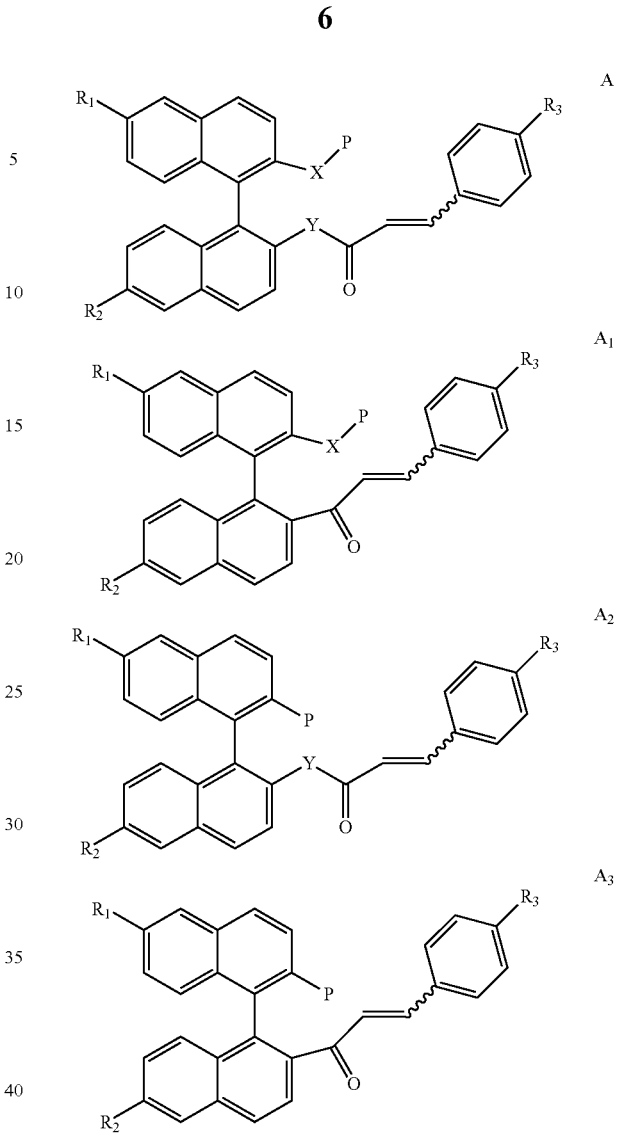

wherein each of $R_1$, $R_2$ and $R_3$ is independently H, aryl or alkyl, linked directly or as ethers or esters, to confer solubility and modulate twisting power, each of X and Y is independently O, $O(CH_2)_3$ O—, $O(CH_2)_4$ O— or $O(CH_2)_6$ O—, and P is acrylate, methacrylate or styrene.

In general, these high-twist nematic dopants can induce a high change in pitch of a cholesteric helix when exposed to defined wavelengths of light. By exposure to light, multiple color effects can be achieved in the liquid crystal film. Exposure of defined light, such as UV, can be achieved thorough masks for simple designs. Complex imagery may be generated through exposure by laser such that each laser point exposure can generate a different color and each color can shift when the images are tilted. The laser approach offers the ability to generate high resolution images and multiple colors. Further, a post-phototuning approach offers the ability to pattern individual images or labels enabling personalization of each.

The trigger molecules can be introduced into the liquid crystal material as a dopant in various steps during the process of manufacturing the OVDs. In general, the addition of the dopant causes a change in the twisting properties of the liquid crystal material. Thus, when induced or activated, the liquid crystal material with dopant is effective to produce a twist pitch different from a natural twist state. That is, the dopant is able to affect the twist properties of the chiral structure of the cholesteric liquid crystal and thus, change the optical properties. The effect can be to increase or decrease the natural twisting action by exposure to incident light. The dopant can be configured to achieve these effects by varying at least one of the wavelength, the intensity of the incident light, or the exposure time to the incident light.

The trigger molecules of the invention include binaphthalene and derivatives thereof that behave as high-twist nematic dopants.

FIG. 1 illustrates the twisting power and configuration of binaphthalene and derivatives thereof, in accordance with certain embodiments of the invention. The twist associated with binaphthalene is shown by the image A in FIG. 1. As shown in images B and C, the twisting power of binaphthalene derivatives may be influenced by the nature and position of substituents around the core. As shown in image B in FIG. 1, linear extension along the naphthalene long axes (2,6-positions) increases compatibility with nematic hosts and can enhance twisting power. As shown in image C in FIG. 1, deviation from the basic structure can reduce twisting power by a combination of two factors, which can result in a low twist state and can result in reducing compatibility with the nematic host and/or changing the overall twisted molecular conformation. This is exemplified by comparison of the following binaphthalene derivatives of the Formulas 1 and 2 where cinamates are selected as the photoisomerizing subunit to switch between high and low twist isomers. Other photoisomerizing subunits, such as but not limited to, stilbenes and azobenzenes can be employed. However, other subunits may be more difficult to synthesize. The structures of Formulas 1 and 2 are non-limiting examples of suitable trigger molecules (dopants) for use in effecting a change in twist state.

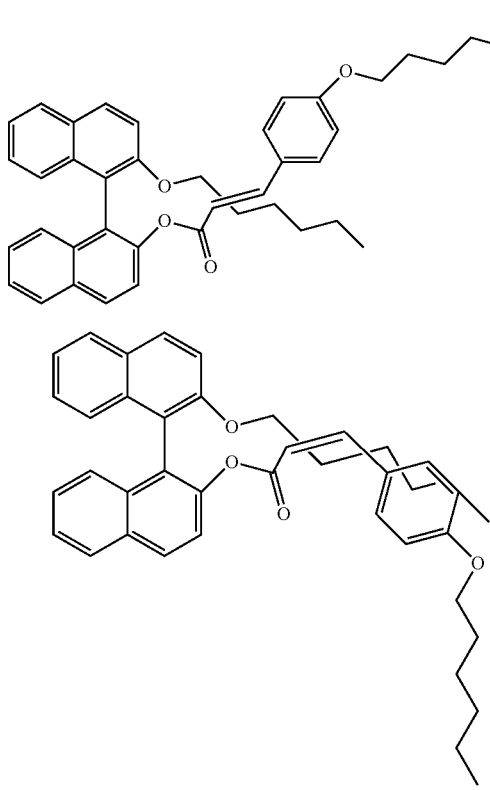

Irradiation of cinamates establishes a wavelength dependent photostationary state (equilibrating mixture) between Formulas 1 and 2. Formula 1 exhibits high twist having a HTP of 42 and Formula 2 exhibits low twist having a HTP of 16. Thus, irradiation of a formulation containing Formula 1 will result in a reduction of overall twisting power and irradiation of a formulation containing Formula 2 will result in an increase in dopant twisting power. Each of Formulas 1 and 2 can be synthesized as either R or S enantiomers (mirror images of each other) having equal twisting power magnitudes but opposite twist sense. Thus, within a given chiral nematic formulation, the dopant twisting influence can be chosen to either reinforce or counteract native twist. Irradiation can therefore be chosen to shift the reflected color towards red or blue.

Upon establishing a change in twist, it is desired to maintain this twist state such that it does not revert to the original or natural twist or blur the image through diffusion. Retention of the change in twist can be accomplished in various ways, including but not limited to, curing, e.g., polymerization. For final manufactured products, images can be fixed in place (e.g., unchanged or unmoved) through polymerization of the nematic film. The polymerization process can incorporate trigger molecules of the invention when the trigger molecules are modified to incorporate a compatible polymerizable unit, such as but not limited to, an acrylate functionality.

In certain embodiments, trigger molecules exemplified by the following structure of Formula 3 are suitable for polymerization.

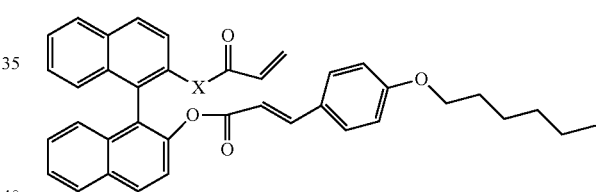

wherein X is O, O(CH$_2$)$_3$ O—, O(CH$_2$)$_4$ O— or O(CH$_2$)$_6$ O—.

Formula 3 is a binaphthalene linked to a polymerizable unit. The polymerizable unit can vary and may be selected from those known in the art. As mentioned, in certain embodiments, the polymerizable unit is an acrylate. In other embodiments, the polymerizable unit can be selected from known free-radical polymer precursors including, but not limited to, methacrylate, styrene and mixtures thereof. Acrylate may be preferred based on convenience of the synthesis. The cinamate bears a single substituent to improve solubility and enhance the HTP difference between isomers. In Formula 3, this single substituent is an alkyl ether (hexyloxy-). In certain other embodiments (e.g., Formulas A, A1, A2 and A3), the substituents can be selected from single and multiple substituents on the cinamate itself and/or the binaphthalene core, including but not limited to, hydrocarbons, ethers, esters, ketones and mixtures thereof. The twisting power varies with small changes to the molecular structure. This concept is demonstrated by Formula 3, wherein the twisting power (HTP) is recited for variations of X. For Formula 3, the highest twisting power of HTP=52 is achieved wherein X is O(CH$_2$)$_6$O— (referred to herein as Formula 3d) for a spacer length of six methylene units between the chiral naphthalene core and the polymerisable acrylate. While all trigger molecules incorporating these design features can be used for image generation, trigger molecules having the Formula 3d have the most favorable properties as compared to Formula 3 structures wherein X is O with HTP=6 (referred to herein as Formula 3a), wherein X is O(CH$_2$)$_3$O— with HTP=23 (referred to herein as Formula 3b) and wherein X is O(CH$_2$)$_4$O— with HTP=20 (referred to herein as Formula 3c), because it can be used at the lowest concentration to achieve the highest twist power.

Formulas 1, 2 and 3, including 3a, 3b, 3c and 3d, are non-limiting examples of suitable trigger molecules in accordance with certain embodiments of the invention. Further, combinations and mixtures of Formulas A, A1, A2 and A3, such as Formulas 1, 2 and 3, including 3a, 3b, 3c and 3d, are suitable. Moreover, it is preferred in certain embodiments to employ Formula 3, including 3a, 3b, 3c and 3d, as trigger molecules and 3d may be most preferred.

In certain embodiments, film and image formation techniques are exemplified by using a chiral nematic liquid crystal formulation that has a green reflection when viewed normal to the plane of the surface. Addition of about 1% w/w of trigger Formula 3d (R isomer) into the formulation reinforces the natural twist and results in a blue-shifted reflection (appearing blue). Addition of about 1% w/w of trigger Formula 3d (S isomer) into the formulation opposes the natural twist and results in a red-shifted reflection (appearing orange). Irradiation at 350 nm (through a mask to produce an image) shifts the reflected color toward the native green. The contrast is sharp and the image can be subsequently fixed through irradiation at shorter wavelengths (e.g., to activate a photoinitiator). It has been found that fixing is essentially instantaneous if carried out under an inert (e.g., nitrogen) atmosphere.

In the invention, multiple colors can be achieved through control of the dosage of incident light through multiple masks or by varying the wavelength of the light source.

As mentioned herein, the twisting properties of the trigger molecules are dependent on at least one of wavelength, intensity of the incident light and exposure to incident light. Thus, different approaches to the production process may be required based on the selection of trigger molecules.

In general, the process for web-based production includes the following steps which are performed in the following sequence (i.e., starting with number 1 and ending with number 4):

1. Coat;
2. Align;
3. Address/Mask Wavelength 1; and
4. Cure Wavelength 2.

Coating is required to meter the correct or appropriate amount of liquid crystal material in the correct or desired area. The liquid crystal material is deposited on a substrate using conventional techniques and known apparatus. The substrate can include various materials known in the art for producing OVDs. In certain embodiments, the substrate is polyester or a polyester-containing material. Depositing of the liquid crystal can include flood coating of the entire web or discrete coating of patches or specific graphics or text in defined areas. The coating methods can be selected from typical print coating processes such as, but not limited to, ink jet flexographic, offset, gravure, slot coating and spraying. In certain embodiments ink jet printing allows individual heads to be positioned across a production web that can coat or print unique areas relating to individual products such as, but not limited to, security labels or laminates. These can be patterned individually creating personalized information or images. The choice of coating or printing is also relevant to the control of the thickness of the liquid crystal layer commensurate with different products or applications.

Aligning is required so that the cholesteric helical axis is perpendicular to the plane of the substrate and a color is observed. To achieve a liquid crystal layer that can be used as a secure OVD, the liquid crystal must align either naturally or by some forced means. If naturally, the time to align is highly dependent on the particular substrate selected. A pre-coated primer is frequently required. Photo alignment layers may also be used. It is generally known that forced alignment can be achieved through conventional lamination or a shearing process.

Addressing is the term used to denote the process of the application of light to induce a change in chiral twist of the doped liquid crystal material. This invention includes two distinct methods for optically addressing the dopant. A first method is fixed masks with flood light source allowing fixed images. A second method is variable scanning light source allowing custom addressable data.

In the first method, fixed masks may be implemented in the following two ways to achieve multi-colored effects visible by the naked eye. In certain embodiments, the masks are single complex greyscale masks beam or line scanned to generate multiple color effects. In certain other embodiments, the masks include several masks each with its own exposure in sequence.

In the second method a beam of light is scanned across the surface of the liquid crystal material to provide localized exposure. If the dopant material is selected so that sensitivity to wavelength controls the twisting power, the exposure will generate a second color. A third color may be generated if a second light having a different wavelength is used. Variable scanning can also alter the chiral twist by intensity difference. That is, by controlling local point-to-point exposure from a single light source such as, but not limited to lasers, UV lamps and light emitting diodes (LEDs). Varying the exposure point-to-point results in variations in the twisting power point-to-point and therefore, in the color point-to-point. In this way variable color images can be created or red, green, blue pixel elements created to generate multiple and full color images. Such a process is employed after the coating stage. The additional multiple color elements can be different across the production web so that each image for a security product, such as but not limited to, labels and laminates, can be patterned with unique and personalized images and data. Various known scanning technologies can be used such as galvanometric, resonant, polygon, acousto-optic, and projection of active devices, such as multi-mirror systems. Control of the scanning and exposing addressing head can be independent from or part of a computer-controlled production system and provides input relevant to the security image or security data required.

Once the trigger molecules in the liquid crystal have been addressed by the optical system and a desired twist state is achieved, the cholesteric liquid crystal security material properties are then fixed to retain the desired twist state and preclude reversion to a previous or natural twist state and to prevent blurring by diffusion. In certain embodiments, fixing of the properties is conducted by employing a polymer matrix cross-linking system. Cross-linking is achieved by using UV exposure to cure the material in its aligned liquid crystal state. The final curing can be achieved in a nitrogen atmosphere or via a suitable mix of photoiniators to fully cure in atmospheric conditions, as the top surface is exposed in the production process.

In certain embodiments, the light wavelength employed in addressing the trigger molecules is different from the curing wavelength so that the addressing can be carried out effectively and completely prior to crosslinking the system. The addressing wavelength can have a higher or lower frequency than the curing wavelength. Typically, available UV light sources cure in the region of both UVA and UVB bands with the photoiniators having response bandwidths between about 50 to about 100 nm. The addressing wavelength is typically outside this bandwidth and may be a narrow-band laser source. Visible light can be used but may not be preferred due to handling and operational implications. In certain embodiments, wherein a varying wavelength system is used, a wavelength tuning system may be employed, such as a tunable source or a monochromator with a broadband source.

To achieve different (i.e., multiple) colors in different areas of a product, a method is employed that is capable of delivering a dosage of a particular wavelength uniquely to different regions of the product. This is referred to as "optical addressing" and in accordance with the invention can be performed using fixed masks combined with flood illumination to allow fixed multi colored images or variable delivery of light across the product to allow custom addressable multi-colored images.

In the fixed mask method, as described herein, a physical mask is used to obtain an image in one color from a background in another color. The mask, of any form, shields the background but transmits the wavelength of the trigger molecules only to the image region. The color of this region then depends on the intensity (dosage) or wavelength of the illuminating light, depending on which form of the trigger molecules is used. In certain embodiments, the fixed mask can be implemented using grayscale or binary masks. Greyscale will allow the complete color image to be imparted in a single pass by the mask as the intensity (dose) delivered to each area of the web is proportional to the greyscale level. This is an effective and efficient method, however, conventional greyscale mask technology limits the practical production/implementation. With binary masks, such as simple photomasks, each mask can provide one color if illuminated with flood illumination of the appropriate intensity and wavelength. Multiple colors can be obtained using multiple masks in sequence each with its own exposure system or multiple passes through one system where the mask is changed each time.

In certain embodiments, the method of addressing uses a programmable dynamic optical system coupled with an appropriate source, which includes lasers, LEDs or other UV source. The light is delivered using either scanning or projected illumination methods only to the required area with the appropriate intensity (dose) and wavelength to trigger and tune the area to the required color. In a scanning system, the beam can be focused to a scanning spot that scans the target image point by point. The color imparted to the liquid crystal material, at each point, is determined by either the intensity or the wavelength of the point. This can be dynamically varied using either a modulator for intensity control or wavelength tuning of the source either directly or using monochromators. With these methods, custom addressable data of any color can be imparted to the product.

Mass production of OVDs employing the methods described herein is most effectively implemented using web-based equipment. For both mask-based or addressable systems, the liquid crystal material first is coated or printed on the web with the appropriate thickness and aligned to achieve a uniform color that then is modified by the mask or addressing system. In the invention, the liquid crystal material to be coated or printed includes the trigger molecules. Coating is required to meter the correct amount of liquid crystal material in the correct location on the web. The thickness determines the level of reflectivity or brightness that can be achieved. In the visible region this typically requires a minimum thickness of about 4 to about 5 microns. The coating method can be selected from typical print coating processes such as, but not limited to, inkjet, flexographic, offset, gravure, slot coating and spraying. Flood coating of the entire web or discrete coating of patches or specific graphics or text in defined areas can be used as appropriate to the product and application. Ink jet printing provides a specific embodiment of the method of coating as it allows individual heads to be positioned across a production web that can coat or print unique areas relating to individual products such as, but not limited to, security labels or laminates. These can be patterned individually creating personalized information or images. The choice of coating or printing is also relevant to the control of the thickness of the liquid crystal layer commensurate with different products or applications.

To achieve a liquid crystal layer that can be used as a secure OVD, the liquid crystal is aligned either naturally or by a forced means. Therefore, the trigger molecules are combined with the liquid crystal material and this mixture is used to coat a selected substrate. The liquid crystal/trigger molecule coating layer is aligned such that the cholesteric helical axis is perpendicular to the plane of the substrate and a specific color is observed by a viewer, e.g., by the naked eye, at the normal angle of view. In certain embodiments, trigger molecules selected from Formulas A, A1, A2, A3, 1, 2 and 3 including 3a, 3b, 3c and 3d are combined with the liquid crystal to form a composition or coating mixture. The coating mixture is applied to or deposited on a substrate, such as a polyester substrate, and to form a layer or coating and the coated substrate is then aligned in order to affect the twist properties of the coating mixture (i.e., liquid crystal and trigger molecules).

Alignment is a complex process dependent on properties of the liquid crystal material, the substrate and the bounding interfaces. Natural alignment will occur on certain polar surfaces with specific anchoring properties. In these situations, there is a natural time required for alignment to occur (typically several seconds) that is highly dependent on the selected substrate. A pre-coated primer is frequently required depending on the polar nature of the substrate surface, its surface energy, anchoring properties, coating thickness and mobility. In this scenario of natural alignment, the bottom interface is with the substrate and the top is open to the atmosphere and has no defined anchoring interface, which limits the alignment time and ultimate efficiency.

Various methods have been used to improve alignment efficiency and time, and to broaden the range of substrate types that can be used. These methods include mechanical rubbing and surface structures, and alignment inducing pre-coat layers that induce more effective twist alignment but also provide suitable adhesion to useful substrates and the liquid crystal material itself. Such pre-coat layers include various chemical and photo addressable materials. They provide orientated anchoring surfaces that adhere suitably to the substrate below and the liquid crystal material, which improve alignment and extend the useful range of substrate materials.

It is also known that forced alignment can be achieved quickly through lamination or via any shearing process. In these processes, both surfaces are bound and the shearing or laminating action induces the chiral twist to occur immediately resulting in instant alignment and color. However, the liquid crystal surface is not openly and easily accessible for further treatment.

As previously mentioned herein, following addressing, the liquid crystal system properties are fixed using, for example, a polymer matrix crosslinking system. The crosslinking typically requires UV exposure. There will be a response time after the material has been addressed within which the material is crosslinked to maintain the desired color. This is dependent on the selected dopant and the material properties of the liquid crystal material. The final curing may require an inert atmosphere or a suitable mix of photoinitiators. The curing wavelengths required will depend on the blend of photoinitiators. Typically, curing can be conducted using various types of mercury lamps and UV and/or LED systems.

As the liquid crystal coated material is wet, the mask is located either in close proximity to the wet surface or, as is preferred, on the back surface of the substrate web. This can be implemented by laminating the mask to the back of the web in a flat plane or, more conveniently on continuous web systems, by locating the mask on a transparent cylinder that the web passes over. The cylinder and mask material transmits the wavelength for the trigger molecules sufficiently well to allow the required dose to get to the liquid crystal material. If the triggered material is sufficiently stable then a second and third masked color can be exposed in register inline and the final UV crosslink done with a cure station at the end of the process. If the color relaxes quickly then each mask station will require cure as soon as possible and may require a cure station after or even incorporated within each mask station.

Variable delivery, although seemingly more complex, allows custom data to be put in each image. For many applications this is a significant advantage.

In an addressable embodiment, an optical system is configured to deliver light of appropriate intensity and wavelength, and the system changes the intensity or wavelength dynamically to induce color change point-by-point in manufacture. This dose is delivered while operating at practical line speeds for production and achieving good spatial resolution, at least below 100 microns features size (TBC), typically 50 microns (TBC), over the width of the web or within discrete patches as required.

Many scanning and delivery technologies can be used including, galvanometric, resonant, polygon or acousto optic scanners or active projection systems operating in either in area or line form using for example multi mirror light modulators. Light sources include lasers, LEDs and medium pressure mercury lamps with specific dopants. The choice of source depends on the specific dopant requirements.

Control of the scanning and exposing addressing head can be independent from or part of the computer controlled production system and provides the data relevant to the security image or security data required.

If the dopant material is selected such that sensitivity to wavelength controls the twisting power, the exposure will generate a second color and third color if a second wavelength of light is used. In this embodiment a wavelength tuning system would be required, such as tunable laser or a monochromator with a broadband source.

The addressing head can be envisaged as a module to be integrated into a product line system. The module is integrated with a computer system to continuously send the data required. The system requires a web registration feature so that the address system can trigger correctly and place features where required.

A factor in the embodiment that uses a fixed addressing wavelength, is the separation of the dopant addressing wavelength from the curing wavelength such that the wavelength used for addressing the dopant is different, either higher or lower, than the wavelength used for the curing process. The addressing can be carried out sufficiently before the entire system is cured, e.g., crosslinked. As mentioned herein, available light sources usually mean curing a wavelengths in both UVA and UVB bands with the photoiniators having typically response bandwidths between about 50 to about 100 nm. The addressing wavelength should be outside the bandwidth and may be a narrowband laser source. The visible is not preferred for handling and operational implications.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof. Furthermore, the following examples are meant to be illustrative of certain embodiments of the invention and are not limiting as to the scope of the invention.

EXAMPLE

A sample was prepared using a black polyester substrate of 50 μm thickness (SKC SB00), A commercial preparation of cholesteric liquid crystal was used with the addition of 0.5% of the trigger system (R)-3d. This preparation was coated onto a small sheet of the substrate using a Meyer bar coater (RK model K control coater) to give a 5-10 μm coating thickness once the formulation solvent was driven off by gentle heating with a hot air gun.

The coated substrate was fixed into a masking jig so that a photolithographic mask could be brought into close proximity to the liquid crystal layer. Two registered photomasks were prepared with different design features in different areas so they could be sequentially placed in the mask jig to obtain different images in different areas of the sample. The following exposure procedure was used. Filtered UV light from a UV light technology medium pressure UV Hg source (model UV/P 280) was employed. The choice of different wavebands created different twisting of the liquid crystal helix structures to create different colors once the crystal material was aligned. The wavelengths and exposures were selected so as to create a red, green and blue color.

With mask 1 in place, 5 sec exposure was made using a filter to select a specific waveband in the UVA region. With mask 2 in place, a 5 sec exposure was made using a second filter which selected a different waveband in the UVA region. Regions exposed in the first exposure were masked in the second one. The mask was then removed and a short exposure was made with a third filter in the waveband regions 310 nm; 350 nm and 375 nm. To prevent heat getting to the sample, a dichroic filter was also used in each exposure.

The sample was then exposed to unfiltered UV light (UVA and UVB) from a high power medium pressure UV Fusion lamp (UV Fusion lamp model F300) for 4 seconds in an atmosphere of nitrogen to cure the sample. This was done immediately after the mask curing stage to prevent any relaxation of effects occurring.

We claim:

1. A dopant for a liquid crystal material which contains helical elements having a natural twist, the dopant effective to change the natural twist of the helical elements when addressed with incident light, the dopant comprising at least one trigger molecule having a structure selected from the group consisting of Formulas A, $A_1$, $A_2$, $A_3$, 1, 2, 3 and mixtures thereof:

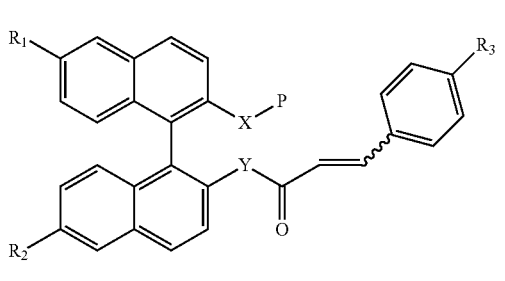

A

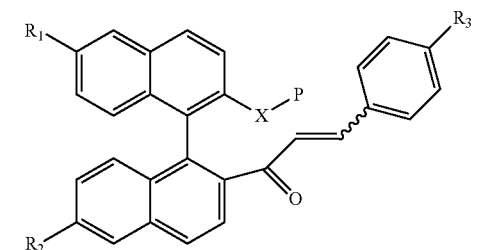

$A_1$

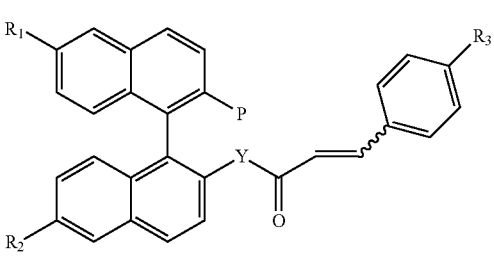

$A_2$

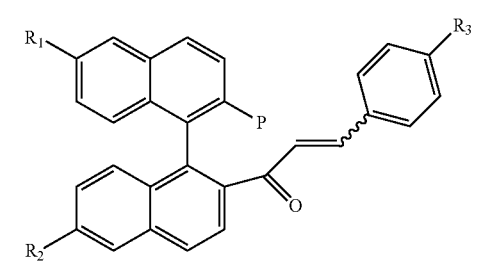

$A_3$

1

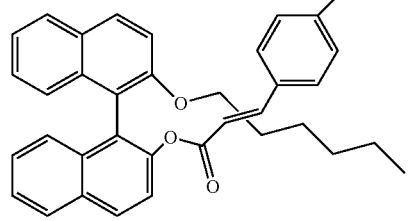

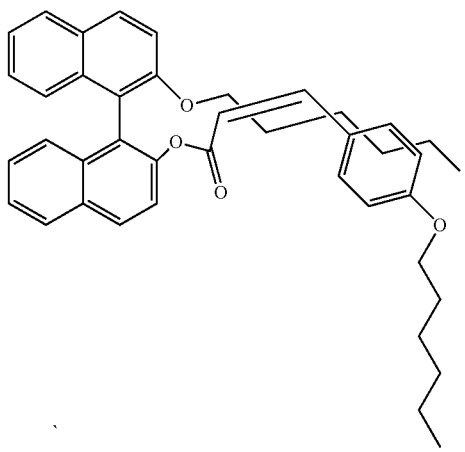

2

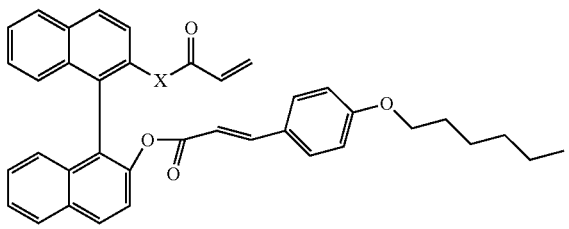

3 wherein each of $R_1$, $R_2$ and $R_3$ is independently H, aryl or alkyl, linked directly or as ethers or esters, to confer solubility and modulate twisting power, each of X and Y is independently O, $O(CH_2)_3O$—, $O(CH_2)_4O$— or $O(CH_2)_6O$—, and P is acrylate, methacrylate or styrene.

2. The dopant of claim 1, wherein the at least one trigger molecule has the structure of the fbrmuia 3 wherein X is $O(CH_2)_6O$—.

3. The dopant of claim 1, wherein the change in the natural twist of the helical elements can be dependent on wavelength of the incident light, intensity of the incident light and time of exposure to the incident light.

4. The dopant of claim 1, wherein the incident light is provided by a light source selected from the group consisting of a lamp, light emitting diode, laser and combinations thereof.

5. An optically variable device, comprising:
a substrate;
a composition deposited on at east a portion of the substrate to form a layer thereon, the composition comprising:
a liquid crystal material; and
a dopant containing at least one trigger molecule having a structure selected from the group consisting of Formulas A, $A_1$, $A_2$, $A_3$, 1, 2, 3 and mixtures thereof:

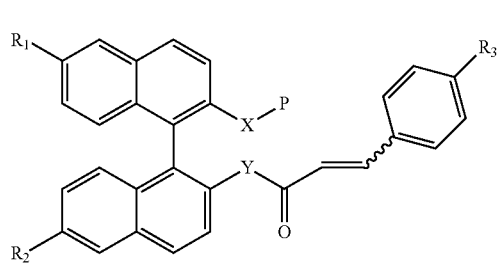

A

-continued

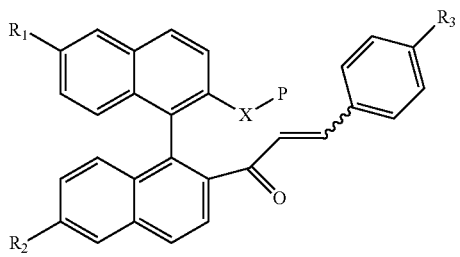

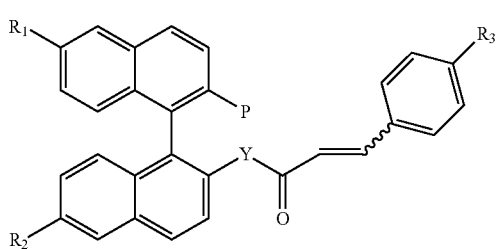

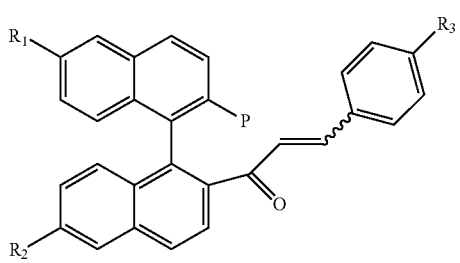

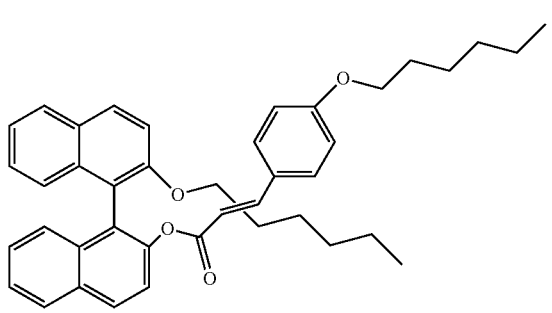

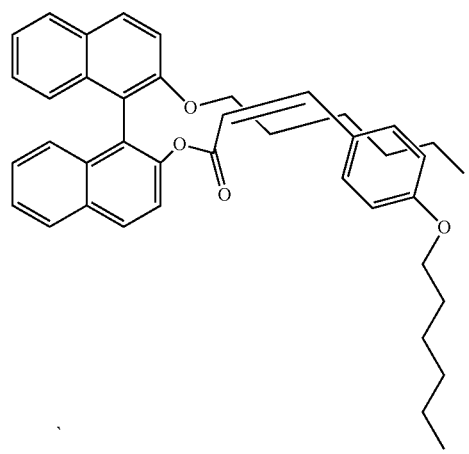

-continued

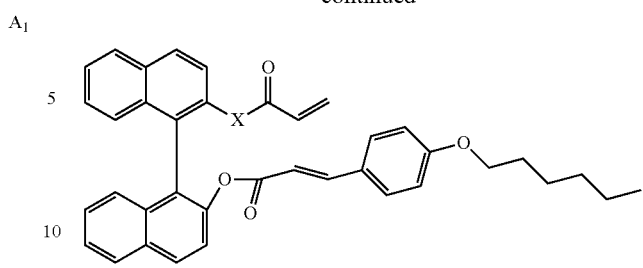

wherein each of $R_1$, $R_2$ and $R_3$ is independently H, aryl or alkyl, linked directly or as ethers or esters, to confer solubility and modulate twisting power, each of X and Y is independently O, $O(CH_2)_3O—$, $O(CH_2)_4O—$ or $O(CH_2)_6)—$, and P is acrylate, methacrylate or styrene.

6. The optically variable device of claim 5, wherein the substrate is selected from the group consisting of polyester and polyester-containing materials.

7. The optically variable device of claim 5, wherein multiple color effects are visible by the naked eye when viewed at one or more angles.

8. A method of preparing an optically variable device, comprising:
  providing a substrate;
  depositing a composition on at least a portion of the substrate to form a layer thereon, the composition comprising:
    a liquid crystal material; and
    a dopant containing at least one trigger molecule having a structure selected from Formulas A, $A_1$, $A_2$, $A_3$, 1, 2, 3 and mixtures thereof:

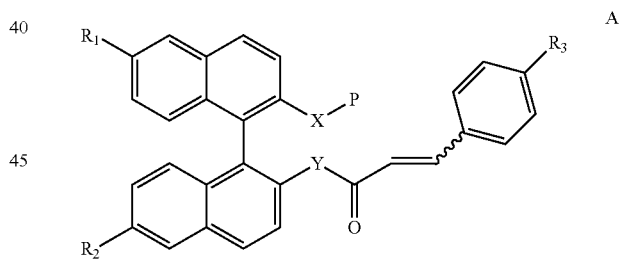

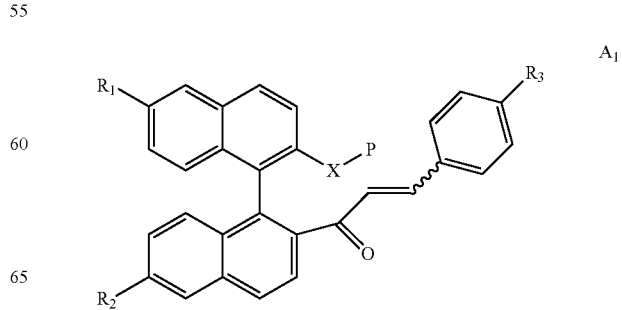

-continued

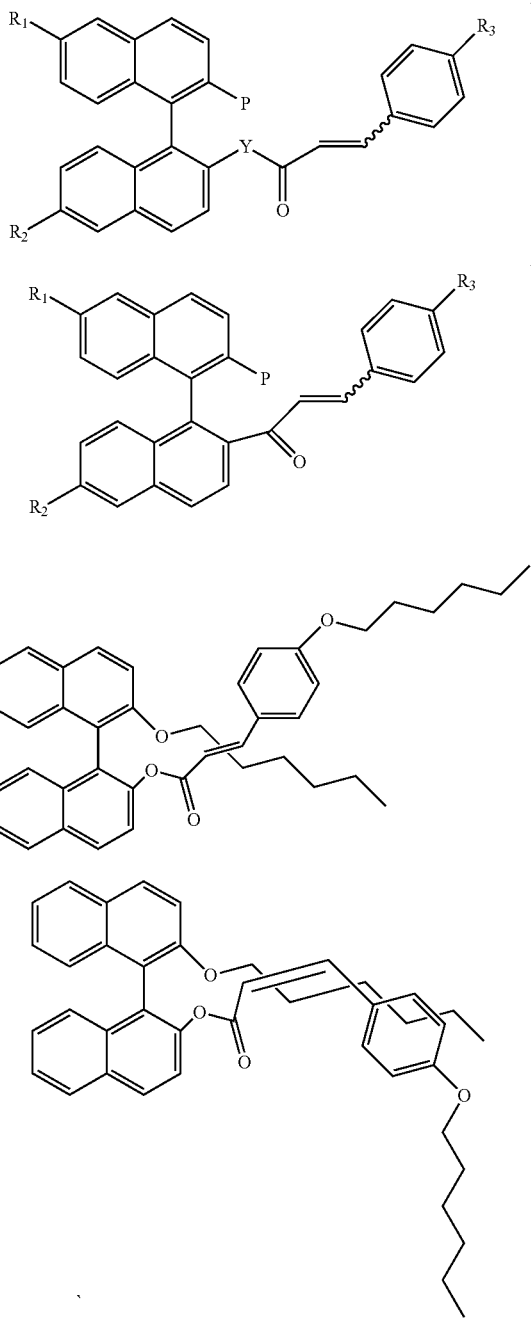

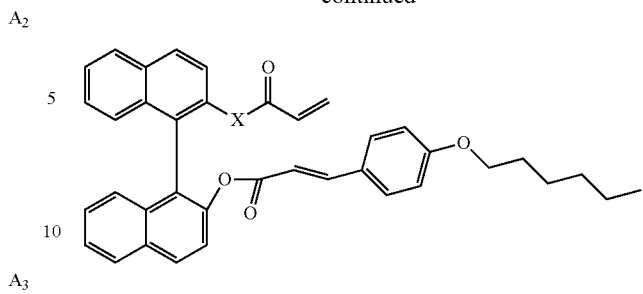

wherein each of $R_1$, $R_2$ and $R_3$ is independently H, aryl or alkyl, linked directly or as ethers or esters, to confer solubility and modulate twisting power, each of X and Y is independently O, $O(CH_2)_3O$—, $O(CH_2)_4O$—or $O(CH_2)_6O$—, and P is acrylate, methacrylate or styrene;

aligning the layer;

addressing the dopant in the layer to induce a chiral twist therein, wherein addressing comprises exposing the dopant in the layer to incident light; and curing the layer to fix said chiral twist.

9. The method of claim 8, further comprising varying at least one of wavelength of the incident light, intensity of the incident light and exposure time to the incident light, to obtain a desired twist in the layer.

10. The method of claim 8, wherein depositing the composition is conducted by methods selected from the group consisting of layer and printing.

11. The method of claim 8, wherein curing is conducted by polymerization of the layer.

12. The method of claim 8, wherein the addressing is conducted by employing fixed masks with a flood light source.

13. The method of claim 8, wherein the addressing is conducted by employing a variable scanning light source.

14. The method of claim 8, wherein the addressing is conducted at a wavelength that is different from the wavelength employed for the curing.

15. The method of claim 14, wherein the wavelength employed for the curing is about 360 nm or about 260 nm.

16. The method of claim 14, wherein a photoinitiator is used for the curing and the wavelength employed is between about 200 to about 600 nm.

* * * * *